(12) United States Patent
Lim

(10) Patent No.: US 7,454,930 B2
(45) Date of Patent: Nov. 25, 2008

(54) DRUM-TYPE WASHING MACHINE

(75) Inventor: Hee Tae Lim, Bucheon-si (KR)

(73) Assignee: LG Electronics Inc., Seoul (KR)

( * ) Notice: Subject to any disclaimer, the term of this patent is extended or adjusted under 35 U.S.C. 154(b) by 567 days.

(21) Appl. No.: 10/743,037

(22) Filed: Dec. 23, 2003

(65) Prior Publication Data

US 2004/0168485 A1 Sep. 2, 2004

(30) Foreign Application Priority Data

Dec. 23, 2002 (KR) .................. 10-2002-0082530

(51) Int. Cl.
*D06F 37/36* (2006.01)
(52) U.S. Cl. .................. 68/140; 68/24; 68/58
(58) Field of Classification Search .............. 68/24, 68/58, 140, 131, 133, 132
See application file for complete search history.

(56) References Cited

U.S. PATENT DOCUMENTS

| | | | | | |
|---|---|---|---|---|---|
| 2,161,604 | A | * | 6/1939 | Watts .................. | 68/12.02 |
| 2,174,662 | A | * | 10/1939 | Josephs, Jr. ........... | 310/99 |
| 2,399,319 | A | * | 4/1946 | Bowen et al. .......... | 475/318 |
| 2,538,620 | A | * | 1/1951 | Heinrich ............... | 74/75 |
| 2,771,794 | A | * | 11/1956 | Shenk et al. .......... | 475/139 |
| 2,836,046 | A | * | 5/1958 | Smith ................... | 68/23.2 |
| 3,257,830 | A | * | 6/1966 | Shelton ................ | 68/133 |
| 3,813,828 | A | * | 6/1974 | Bennett ................ | 451/28 |
| 3,840,764 | A | * | 10/1974 | Burger ................. | 310/185 |
| 5,187,954 | A | * | 2/1993 | Kim et al. ............ | 68/3 R |
| 5,373,715 | A | * | 12/1994 | Sharp et al. ........... | 68/23 R |
| 7,028,512 | B2 | * | 4/2006 | Chang .................. | 68/53 |
| 7,086,254 | B2 | * | 8/2006 | Lim et al. ............. | 68/23.7 |

FOREIGN PATENT DOCUMENTS

DE 39 27 426 * 2/1991

(Continued)

*Primary Examiner*—Frankie L Stinson
(74) *Attorney, Agent, or Firm*—Birch, Stewart, Kolasch & Birch, LLP

(57) ABSTRACT

A drum-type washing machine is provided, by which a rotational speed of a drum is stably and accurately controlled during washing and dewatering by adopting a simple induction motor and a set of unidirectional bearings acing as a clutch. The drum-type washing machine, which has a motor having a stator and a rotor for rotating a drum to perform washing and dewatering, includes an outer housing fixed to the stator of the motor; a gear shaft, extending from a center of the rotor of the motor, for transferring a rotational force of the motor; a drum shaft, extending from a center of the drum, for receiving the rotational force of the motor; a gear-reduction mechanism, interposed between and coupled respectively to the gear shaft and the drum shaft, for reducing a rotational speed of the gear shaft and transferring the reduced rotational speed to the drum shaft, the gear-reduction mechanism having an outer surface enabling rotation with respect to the outer housing; a first set of bearings for supporting the gear-reduction mechanism in the outer housing, at least one of the first set of bearings enabling rotation in a first direction while checking rotation in a second direction; and a second set of bearings for supporting the gear shaft and drum shaft in the gear-reduction mechanism, at least one of the second set of bearings enabling rotation in the second direction while checking rotation in the first direction.

11 Claims, 2 Drawing Sheets

FOREIGN PATENT DOCUMENTS

| | | | |
|---|---|---|---|
| GB | 2 202 867 | * | 10/1988 |
| GB | 2202867 | * | 10/1988 |
| JP | 64-49599 | * | 2/1989 |
| JP | 2-74293 | * | 3/1990 |
| KR | 2001100438 | * | 11/2001 |
| WO | WO 02/40761 A1 | | 5/2002 |

* cited by examiner

DRUM-TYPE WASHING MACHINE

This application claims the benefit of Korean Application No. 10-2002-0082530 filed on Dec. 23, 2002, which is hereby incorporated by reference.

BACKGROUND OF THE INVENTION

1. Field of the Invention

The present invention relates to a drum-type washing machine, and more particularly, to a drum-type washing machine employing an induction motor for rotating the drum, in which the drum's rotational speed is accurately and stably controllable for both washing and dewatering.

2. Discussion of the Related Art

Generally, a drum-type washing machine performs washing using a frictional force between laundry and a drum, which is rotated by a transferred driving force of a motor with detergent, water, and the laundry placed in the drum. Such a drum-type washing machine prevents the laundry from being damaged and entangled and brings about such washing effects as beating and rubbing.

Referring to FIG. 1, illustrating a drum-type washing machine according to a related art, a cylindrical tub 2 made of a stainless steel based material is installed within a cabinet 1, and a cylindrical drum 3 is rotatably installed within the tub 2. A motor 5 is installed at one side under the tub 2, and a motor pulley 151 is connected to the motor 15 by a shaft. A drum shaft 31 is installed at a rear side of the drum 3, and a drum pulley 32 is installed at a rear end of the drum shaft 31. The drum pulley 32 is rotatably coupled with the motor pulley 151, which is rotatably connected to the motor 15 via a belt 16 as a power transfer element. A suspension spring 24 is installed between the inner surface of the upper part of the cabinet 1 and the outer surface of an upper part of the tub 2, to support the tub 2; and a friction damper 25 is installed between the inner surface of the lower part of the cabinet 1 and the outer surface of a lower part of the tub 2, to attenuate vibrations that develop in the tub 2 on dewatering. The tub 2 consists of a tub cover 21 forming the front of the tub 2, a tub body 22 forming the sidewall of the tub 2, and a back cover 23 forming the rear of the tub 2. A bearing housing 4, in which bearings 4a and 4b are installed, is assembled at the rear of the drum 3, to be fixed to a central portion of the back cover 23 and receive the drum shaft 31. Three wing portions 41 are integrally formed to radiate from the 120° points about the circumference of the bearing housing 4. End portions of the wing portions 41 are fixed to a rear end of the tub body 22 by a fixing bracket 14 and a bolt 8, which are assembled to be fixed to the back cover 23. Since the back cover 23 made of stainless steel and the motor 15 are installed at the rear side of the tub 2 and thus generate a weight unbalance of the tub 2, a balance weight 26 is provided to a front side of the tub 2 for compensation.

The above-constructed drum-type washing machine is driven by the motor 15, which is typically a brushless DC (BLDC) motor, a universal motor, or the like. These motors are advantageous in that their rotational speed and direction can be accurately controlled but are expensive to manufacture, and their use results in increased power consumption as well as higher production costs. In light of these problems, an induction motor has been suggested.

Nevertheless, while an induction motor may be employed to overcome such problems, it is difficult to control the rotational speed of an induction motor, which directly corresponds to the rotational speed and direction of the drum during washer operations such as washing and dewatering. Accordingly, there is a need for an apparatus enabling an accurate and stable control of the rotation of a lost-cost, low-power drum motor such as an induction motor.

SUMMARY OF THE INVENTION

Accordingly, the present invention is directed to a drum-type washing machine that substantially obviates one or more of the problems due to limitations and disadvantages of the related art.

An object of the present invention, which has been devised to solve the foregoing problem, lies in providing a drum-type washing machine, which accurately controls the rotational speed of a drum, by adopting a set of unidirectional bearings, which acts as a clutch to enable the application of a simple, inexpensive induction motor.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a drum-type washing machine, including a motor having a stator and a rotor for rotating a drum to perform washing and dewatering. The drum-type washing machine comprises an outer housing fixed to the stator of the motor; a gear shaft, extending from a center of the rotor of the motor, for transferring a rotational force of the motor; a drum shaft, extending from a center of the drum, for receiving the rotational force of the motor; gear-reduction means, interposed between and coupled respectively to the gear shaft and the drum shaft, for reducing a rotational speed of the gear shaft and transferring the reduced rotational speed to the drum shaft, the gear-reduction means having an outer surface enabling rotation with respect to the outer housing; a first set of bearings for supporting the gear-reduction means in the outer housing, at least one of the first set of bearings enabling rotation in a first direction while checking rotation in a second direction; and a second set of bearings for supporting the gear shaft and drum shaft in the gear-reduction means, at least one of the second set of bearings enabling rotation in the second direction while checking rotation in the first direction.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain is the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Throughout the drawings, like elements are indicated using the same or similar reference designations where possible.

The present invention employs an induction motor, instead of a brushless DC motor or universal motor, to rotate the drum of a drum-type washing machine. In doing so, the rotational direction and speed of the drum is controlled by controlling the rotation of the induction motor, which includes its direction and its speed as measured in revolutions per minute (rpm). The induction motor employed is preferably capable of a forward (first direction) rotation of at least 350 rpm for washing and a reverse (second direction) rotation of at least 1,200 rpm for dewatering. The rotational speed of the induction motor and in turn that of the drum can be accurately and stably controlled to perform washing or dewatering, by selectively applying to the motor a control signal such as a pulse width modulation signal having a duty ratio varied to achieve ramping, deceleration, steady state control, and the like.

Figure 1:
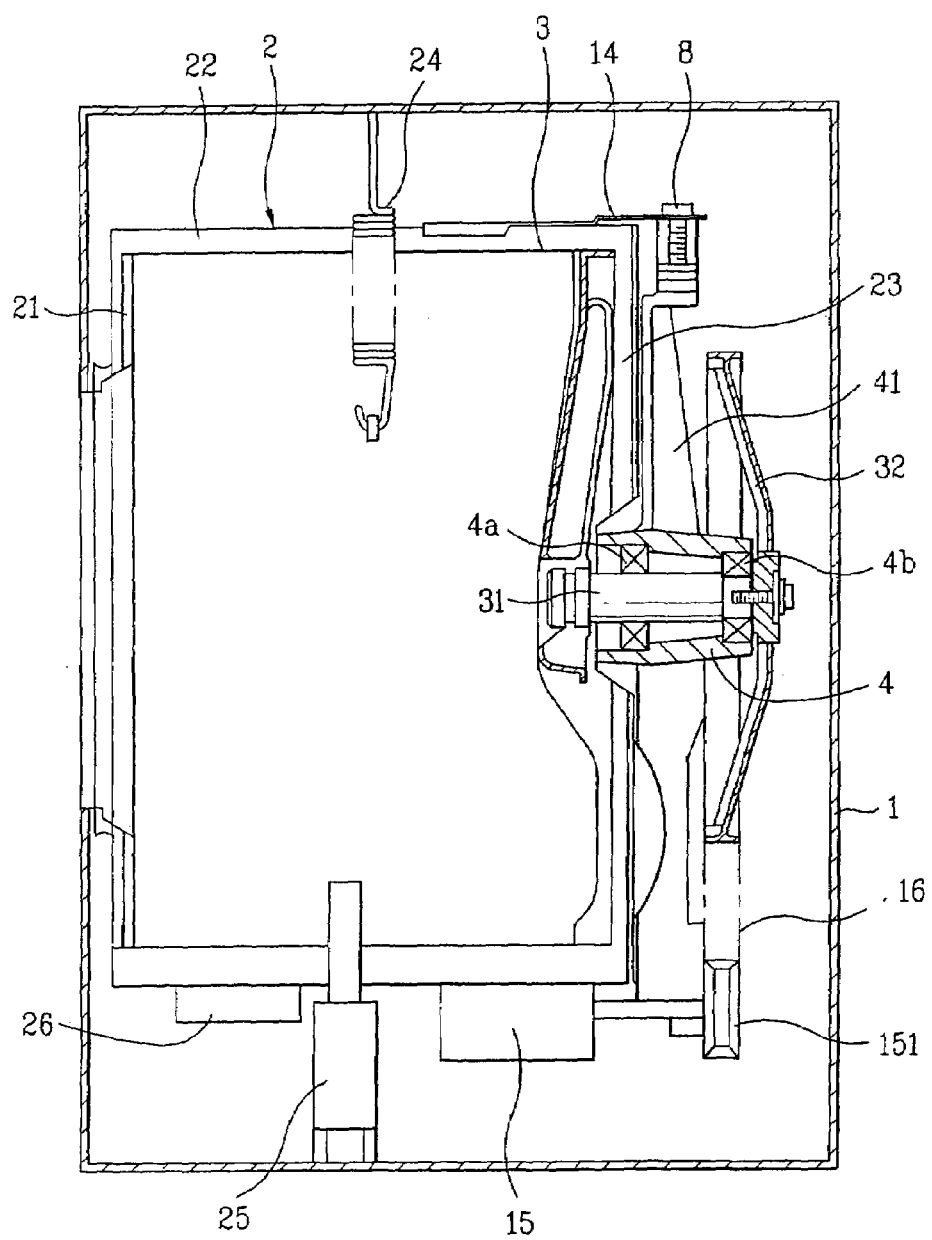
FIG. 1 is a cross-sectional view of a drum-type washing machine according to a related art.
Figure 2:
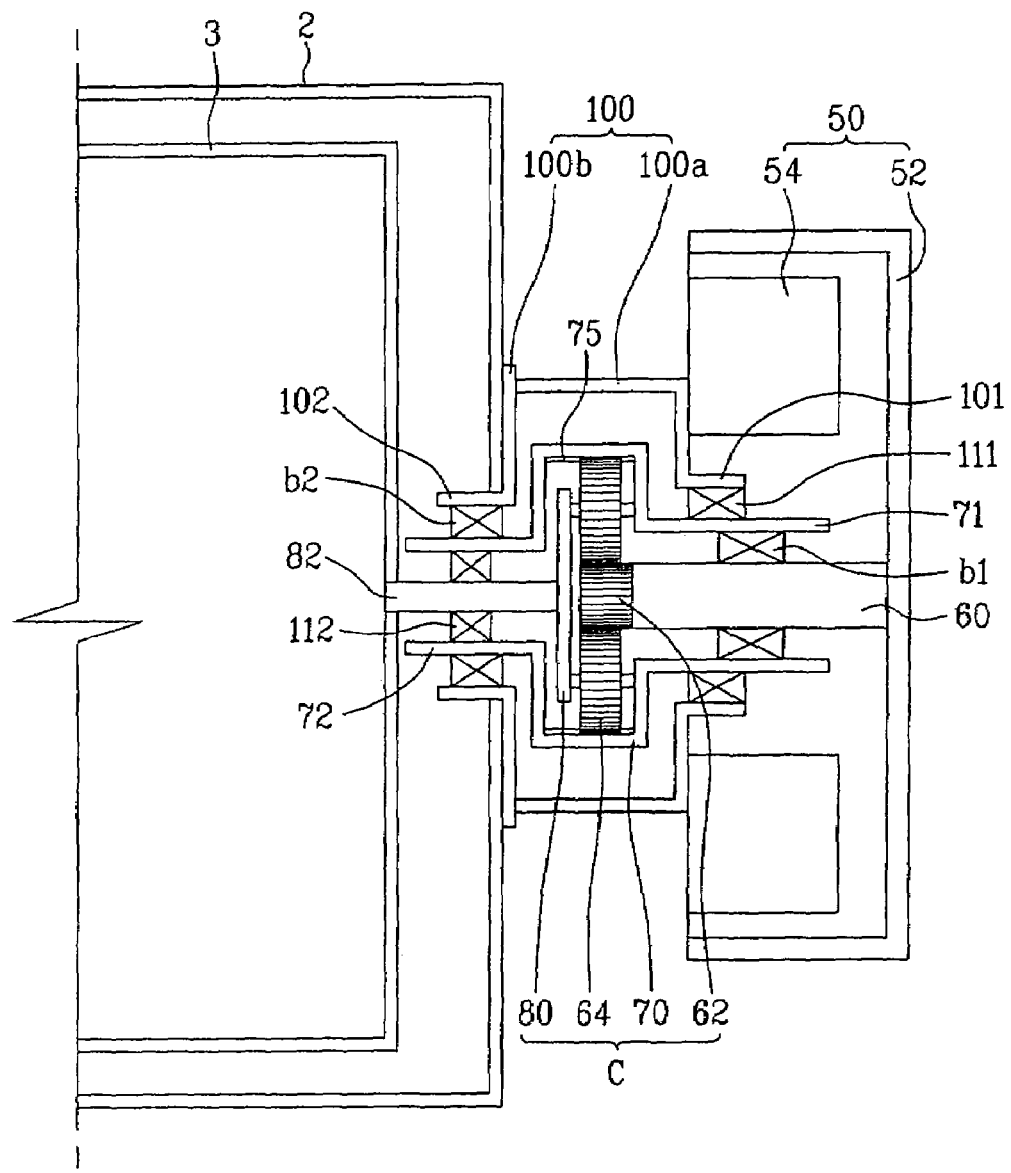
FIG. 2 is a cross-sectional schematic view of a drum-type washing machine according to the present invention, illustrating the clutch configuration of a preferred embodiment.

Referring to FIG. 2, illustrating the clutch configuration of a drum-type washing machine according to a first preferred embodiment of the present invention, an outer is housing 100 consisting first and second housing plates 100a and 100b is centrally fixed to a rear surface of a tub 2 in which a drum 3 is rotatably installed. A drum shaft 82, for receiving a rotational force, extends from the center of the rear side of the drum 3. An induction motor 50, for generating a rotational force, is attached to a rear surface of the first housing plate 100a of the outer housing 100 and consists essentially of a rotor 52 and a stator 54. The rotor 52 of the induction motor 50 is provided with a gear shaft 60, extending from the rotor's center toward the tub 2 and drum 3, to transfer the rotational force of the rotor. A gear-reduction means C, for reducing the rotational speed of the gear shaft 60 and transferring the reduced rotational speed to the drum shaft 82, is interposed between and coupled respectively to the distal ends of the gear shaft and the drum shaft and is rotatably installed in the outer housing 100.

The gear-reduction means C of the present invention comprises a sun gear 62, formed on the circumference of the distal end of the gear shaft 60, for directly transferring the rotational force of the gear shaft; at least one planetary gear 64 engaging with the sun gear and having a central shaft 64a; a rotational plate 80 having first and second sides, connected at the center of the first side to the distal end of the drum shaft 82 and connected at a perimeter point of the second side to the central shaft of the at least one planetary gear, for directly transferring to the drum shaft the planetary gear movement (orbiting) about the sun gear; and a gear housing 70 having a substantially cylindrical shape for encasing the inner workings of the sun and planetary gears and the rotational plate as well as the shafts respectively connected thereto and having first and second bushings 71 and 72 for respectively receiving the gear shaft and the drum shaft, the gear housing including a plurality of teeth 75, formed on an inner circumferential surface of the cylinder, for guiding the planetary gear movement. Preferably, the present invention is provided with a plurality of planetary gears 64, which may be two, three or four in number, in which case the rotational plate 80 serves to gang together their rotation about the sun gear 62. In any event, the gearing of the gear reduction means C results in the rotational speed of the rotational plate 80 and the drum shaft 82 driving the drum 3 being considerably slower than that of the sun gear 62 and the gear shaft 60 as driven by the rotor 52. This gear ratio is preferably set such that the ratio of the rotational speed of the sun gear 62 to that of the rotational plate 80 is 7:1.

As described above, the gear housing 70 has in effect a high-gear end where the gear shaft 60 rotates within the first bushing 71 and a low-gear end where the drum shaft 82 rotates within the second bushing 72. Meanwhile, the gear housing 70 is itself rotatable within the outer housing 100, which is centrally fixed to the rear surface of the tub 2 at one side and has the induction motor 50 attached to the other side. That is, the first and second bushings 71 and 72 of the gear housing 70 provide an outer surface for the gear housing to rotate with respect to the outer housing 100, whereby the first and second bushings rotate with respect to first and second sleeves 101 and 102 provided in the outer housing.

To enable the rotation of the gear shaft 60 and drum shaft 82 within the gear housing 70 and the rotation of the gear housing with the outer housing 100, the present invention is provided with first and second bidirectional bearings b1 and b2 and first and second unidirectional bearings 111 and 112. In detail, the first bidirectional bearing b1 is interposed between the gear shaft 60 and the first bushing 71, the second bidirectional bearing b2 is interposed between the second bushing 72 and the second sleeve 102, the first unidirectional bearing 111 is interposed between the first bushing 71 and the first sleeve 101, and the second unidirectional bearing 112 is interposed between the drum shaft 82 and the second bushing 72.

The present invention is characterized in that the first unidirectional bearing 111 allows the gear housing 70 to rotate within the outer housing 100 in one direction only, e.g., reverse, and that the second unidirectional bearing 112 allows the drum shaft 82 to rotate within the gear housing 70 in the opposite, e.g., forward, direction only. Thus, while the first and second bidirectional bearings b1 and b2 allow free rotation in either direction, the first unidirectional bearing 111 checks (prevents) forward rotation but enables reverse rotation, whereas the second unidirectional bearing 112 checks (prevents) reverse rotation but enables forward rotation. Forward rotation is effected for the performance of a washing step, typically by achieving a motor speed of approximately 350 rpm; reverse rotation is effected for the performance of dewatering, typically by achieving a motor speed of approximately 1200 rpm.

In washing, when the induction motor 50 forwardly rotates at 350 rpm, the sun gear 62 formed at the distal end of the gear shaft 60 connected to the rotor 52 is rotated in the same direction at the same rate. As the sun gear 62 engages with the planetary gears 64, the planetary gears 64 are rotated to revolve (orbit) around the sun gear in a forward direction. In doing so, the rotation of the first bushing 71 of the gear housing 70 within the outer housing 100 is checked by the first unidirectional bearing 111, with the other bearings rotating freely, so that only the gear shaft 60 is rotated. That is, the gear housing 70 is fixed. The orbiting movement of the planetary gears 64 about the sun gear 62 is directly transferred to the drum shaft 82 via the rotational plate 80, to which each shaft of the planetary gears is commonly joined. The second unidirectional bearing 112 enabling the rotation of the drum shaft 82 is configured to check reverse rotation and to allow forward rotation, thereby enabling the drum shaft to rotate freely on washing. While the gear shaft 60 rotates at 350 rpm, the rotational speed is geared down by the sun-and-planetary gear configuration, preferably having a 7:1 gear ratio, so that the drum shaft 82 rotates at 50 rpm, which is appropriate for washing.

In dewatering, when the induction motor 50 reversely rotates at 1200 rpm, the sun gear 62 formed at the distal end of the gear shaft 60 connected to the rotor 52 is rotated in the same direction at the same rate. As the sun gear 62 engages with the planetary gears 64, the planetary gears 64 are rotated to revolve (orbit) around the sun gear in a reverse direction. The orbiting movement of the planetary gears 64 about the sun gear 62 is directly transferred to the drum shaft 82 via the rotational plate 80, to which each shaft of the planetary gears is commonly joined. In doing so, the second unidirectional bearing 112 checks the reverse rotation of the drum shaft 82 within the second bushing 72 of the gear housing 70, such that the entire gear housing assembly is rotated (ganged) together with the drum shaft. That is, upon initiation, though the rotation of the sun gear 62 at the distal end of the gear shaft 60 engages with the planetary gears 64 to perform gear-reduction, since the drum shaft 82 is locked to and thus rotates simultaneously with the second bushing 72 of the gear housing 70, the rotational speed of the combined drum shaft and gear housing will eventually match that of the gear shaft.

The above processes of washing and dewatering are summarized in the following table.

tively supporting the first and second bushings of the gear housing in the corresponding bushings of the outer housing, one of the first set enabling rotation in a first direction while checking rotation in a second direction; and a second set of bearings for respectively supporting the gear shaft and drum shaft in the first and second bushings of the gear housing, one of the second set enabling rotation in the second direction while checking rotation in the first direction. It should be appreciated that the objects and effects of the present invention can be equally achieved by assigning two of the four major bearings as unidirectional bearings and the other two as bidirectional bearings. That is, one of the first and second unidirectional bearings may be assigned as one of the first set of bearings, with the other assigned as one of the second set of bearings, such that one of the first and second bidirectional bearings is assigned as the other one of the first set of bearings, with the other assigned as the other one of the second set of bearings.

|  | function | | | | | | | |
| --- | --- | --- | --- | --- | --- | --- | --- | --- |
|  | washing | | | | dewatering | | | |
| component | speed | direction | gearing | rotation | speed | direction | gearing | rotation |
| induction motor (50) rotor (52) gear shaft (60) sun gear (62) | 350 rpm | forward | direct | locked | 1200 rpm | reverse | direct | locked |
| 1st bidirectional bearing (b1) | 350 rpm | forward | n/a | free | 0 rpm | neutral | n/a | free |
| 1st unidirectional bearing (111) | 0 rpm | neutral | n/a | forward checked | 1200 rpm | reverse | n/a | reverse enabled |
| gear housing (70) | 0 rpm | neutral | n/a | stopped | 1200 rpm | reverse | n/a | ganged |
| 2nd bidirectional bearing (b2) | 0 rpm | neutral | n/a | free | 1200 rpm | reverse | n/a | free |
| 2nd unidirectional bearing (112) | 50 rpm | forward | n/a | forward enabled | 0 rpm | neutral | n/a | reverse checked |
| planetary gear orbit rotational plate (80) drum shaft (82) drum (3) | 50 rpm | forward | reduced | locked | 1200 rpm | reverse | direct | locked |

As summarized above, washing is performed by a forward rotation of the components of the high-gear end of the gear housing 70, in particular, the gear shaft 60, whereby the characteristics and positioning of the first and second unidirectional bearings 111 and 112 cause the gear housing to be fixed with respect to the outer housing 100 while enabling the gear-reduction means C, thereby allowing a gear-reduced forward rotation of the components of the low-gear end of the gear housing, in particular, the drum shaft 82, with respect to the gear housing. On the other hand, dewatering is performed by a reverse rotation of the gear shaft 60, whereby the characteristics and positioning of the first and second unidirectional bearings 111 and 112 cause the gear housing to be rotated with respect to the outer housing 100 while disabling the gear-reduction means C, thereby allowing a direct reverse rotation of the drum shaft 82 with respect to the gear housing. Accordingly, the characteristics and positioning of the first and second unidirectional bearings 111 and 112 result in a fixed gear housing and enabled gear reduction means for washing and a rotating gear housing and disabled gear reduction means for dewatering.

In the embodiment of the present invention as described above, a drum-type washing machine employs a set of four major bearings, comprising a first set of bearings for respec- For example, by arbitrarily assigning bearings b1, 111, b2, and 112 as being disposed at first through fourth bearing positions, respectively, such that the embodiment of the present invention describes the positions of the first and second unidirectional bearings 111 and 112 as corresponding to the above second and fourth positions, respectively, the present invention may employ a unidirectional bearing at each of the first and second positions, the third and fourth positions, or the first and third positions. In doing so, bidirectional bearings would be employed at the unnamed positions.

As described above, a drum-type washing machine according to the present invention employs an induction motor, which is less expensive than a BLDC or universal motor, whereby manufacturing costs are reduced. Moreover, by adopting the gear-reduction means and unidirectional bearings, an appropriate rotational speed of the drum can be achieved for washing or dewatering using an induction motor, whereby power consumption is reduced.

It will be apparent to those skilled in the art that various modifications and variations can be made in the present invention without departing from the spirit or scope the invention. Thus, it is intended that the present invention cover such modifications and variations, provided they come within the scope of the appended claims and their equivalents.

What is claimed is:

1. A drum-type washing machine, including a motor having a stator and a rotor for rotating a drum to perform washing and dewatering, the drum-type washing machine comprising:
   an outer housing fixed to the stator of the motor;
   a gear shaft, extending from a center of the rotor of the motor, for transferring a rotational force of the motor;
   a drum shaft, extending from a center of the drum, for receiving the rotational force of the motor;
   a gear-reduction device, interposed between and coupled respectively to said gear shaft and said drum shaft, that reduces a rotational speed of said gear shaft and transfers the reduced rotational speed to said drum shaft, said gear-reduction device having an outer surface enabling rotation with respect to said outer housing;
   a first set of bearings that supports said gear-reduction device in said outer housing, at least one of said first set of bearings enabling rotation in a first direction while checking rotation in a second direction; and
   a second set of bearings that supports said gear shaft and drum shaft in said gear-reduction device, at least one of said second set of bearings enabling rotation in the second direction while checking rotation in the first direction.

2. The drum-type washing machine as claimed in claim 1, said gear-reduction device comprising:
   a sun gear formed at a distal end of said gear shaft;
   at least one planetary gear engaging with said sun gear and having a central shaft;
   a rotational plate having first and second sides, connected at a center of the first side to the distal end of said drum shaft and connected at a perimeter point of the second side to the central shaft of the at least one planetary gear; and
   a gear housing having a substantially cylindrical shape, said gear housing including a plurality of teeth formed on an inner circumferential surface for guiding said at least one planetary gear movement.

3. The drum-type washing machine as claimed in claim 1, wherein the first set of bearings is provided between the gear-reduction device and the outer housing.

4. The drum-type washing machine as claimed in claim 1, wherein the second set of bearings is provided between the gear-reduction device and the gear shaft or the drum shaft.

5. The drum-type washing machine as claimed in claim 1, wherein one end of the gear shaft is connected to the rotor and the other end of the gear shaft is connected to the gear-reduction device.

6. A drum-type washing machine comprising:
   a tub that holds water therein;
   a drum, provided in the tub, that holds laundry therein;
   an outer housing fixed to a rear surface of the tub;
   an induction motor that rotates the drum, the induction motor including a rotor and a stator fixed to the outer housing and disposed within the rotor;
   a gear shaft extending from the rotor of the motor and passing through the stator;
   a drum shaft extending from the drum; and
   a gear-reduction device rotatably installed in the outer housing and directly coupled to the gear shaft and the drum shaft, wherein the gear-reduction device transfers the rotational force of the gear shaft to the drum shaft, wherein the gear-reduction device is configured to transfer the reduced rotational force of the gear shaft to the drum shaft depending on a rotational direction of the induction motor.

7. The drum-type washing machine as claimed in claim 6, further comprising:
   a first set of bearings, at least one of said first set of bearings enabling rotation in a first direction while checking rotation in a second direction opposite to the first direction; and
   a second set of bearings, at least one of said second set of bearings enabling rotation in the second direction while checking rotation in the first direction,
   wherein the first and second set of bearings allow the gear-reduction device to transfer reduced rotational speed to said drum shaft when the induction motor rotates in the first direction, but the first and second set of bearings allow the gear-reduction device to rotate with the gear shaft and the drum shaft without reducing rotational speed when the induction motor rotates in the second direction.

8. The drum-type washing machine as claimed in claim 7, wherein the first set of bearings is provided between the gear-reduction device and the outer housing.

9. The drum-type washing machine as claimed in claim 7, wherein the second set of bearings is provided between the gear-reduction device and the gear shaft or the drum shaft.

10. A drum-type washing machine comprising:
    a tub that holds water therein;
    a drum, provided in the tub, that holds laundry therein;
    a motor that rotates the drum, the motor including a rotor and a stator;
    a gear shaft extending from the rotor of the motor;
    a drum shaft extending from the drum;
    a sun gear coupled to the gear shaft;
    at least one planetary gear engaging with the sun gear;
    a rotational plate connected to the drum shaft and to a central shaft of the at least one planetary gear;
    a gear housing having an inner circumferential surface engaged with the at least one planetary gear;
    a first set of bearings, at least one of said first set of bearings enabling rotation in a first direction while checking rotation in a second direction opposite to the first direction; and
    a second set of bearings, at least one of said second set of bearings enabling rotation in the second direction while checking rotation in the first direction,
    wherein the first and second set of bearings allow the gear-reduction device to transfer reduced rotational speed to said drum shaft during washing, but the first and second set of bearings allows the gear-reduction device to rotate with the gear shaft and the drum shaft without reducing rotational speed during dewatering.

11. The drum-type washing machine as claimed in claim 10, further comprising an outer housing fixed to the suitor of the motor,
    wherein the first set of bearings is provided between the gear-reduction device and the outer housing, and further wherein the second set of bearings is provided between the gear-reduction device and the gear shaft or the drum shaft.

* * * * *